United States Patent

Warnow

[15] 3,664,370
[45] May 23, 1972

[54] TRIGGER DEVICE FOR OPERATING A CONTROL VALVE OF A RESPIRATORY SYSTEM

[72] Inventor: Detlef Warnow, Luebeck, Germany

[73] Assignee: Dragerwerk Aktiengesellschaft, Lubeck, Germany

[22] Filed: Mar. 10, 1970

[21] Appl. No.: 18,118

[30] Foreign Application Priority Data

Mar. 13, 1969 Germany ...................... P 18 12 829.1

[52] U.S. Cl. ........................... 137/487.5, 336/30, 128/145.8, 73/398 R
[51] Int. Cl. ......................................... G05d 7/00, G011 9/10
[58] Field of Search ................. 137/487.5; 128/145.6, 145.8; 336/30; 73/398 R

[56] References Cited

UNITED STATES PATENTS

| | | |
|---|---|---|
| 2,921,279 | 1/1960 | Cosby et al. .............................. 336/30 |
| 3,068,387 | 12/1962 | Koppel ............................ 137/487.5 X |
| 3,328,733 | 6/1967 | Tausch .................................... 336/30 |

*Primary Examiner*—Henry T. Klinksiek
*Attorney*—McGlew and Toren

[57] ABSTRACT

A trigger device for controlling the operation of a control valve for an artificial respiration system includes a pressure sensitive control element which is admitted with the pressure of a line carrying the respiration gas and it operates and causes a deflection of an actual value indicator which moves in its deflection range past as adjustable inductive barrier. The inductive barrier is connected to an electronic control unit so that deflection of the actual value indicator interrupts, in dependence upon its setting in respect to the inductive barrier, the recoupling of the electronic control unit in order to vary an electrical impulse which is amplified for controlling the operation of a pressure valve in the respiratory gas supply system.

5 Claims, 2 Drawing Figures

INVENTOR.
DETLEF WARNOW

BY

McGlew & Toren

ATTORNEYS

TRIGGER DEVICE FOR OPERATING A CONTROL VALVE OF A RESPIRATORY SYSTEM

SUMMARY OF THE INVENTION

This invention relates in general to a system for controlling respiration and in particular a new and useful trigger device which includes an adjustable ideal value indicator of control pressure and a pressure sensitive control means which is admitted by pressure in the lines carrying the respiration gas for the purpose of regulating the supply of such gas.

There are known devices which are employed with artificial respiration systems for controlling an operating valve in an air carrying line so as to open and close it in dependence on pressure. Generally the insignificant control force produced by the patient is amplified by means of a membrane which is provided at certain locations on the apparatus and which moves in one direction under superpressure and in another direction under subpressure. Other pressure dependent control means to amplify the control force may be used instead of a membrane. In such arrangements mechanical triggering devices are known which include a control membrane which is connected with a long lever arm of a double lever system which also includes a short lever arm which is connected with the spring-loaded valve to be controlled. It is a disadvantage that because of the relatively great frictional losses of the mechanical control that small subpressure impulses for effecting reversal of the pressure conditions may not be sufficient.

Magnetic triggering devices are also known which include one or two magnets for the amplification of reversed impulses to be produced by a control membrane and the distance between the magnets and the armatures which are connected to the control membrane are changeable. In this manner the starting pressure of the trigger (trigger sensitivity) as well as the respiration reversing pressure can be changed. A disadvantage is that when the desired reversing pressure value is adjusted, the trigger sensitivity changes as well. A further disadvantage of magnetic triggering devices consists in that, with too great an approximation of the magnet toward the armature for the purpose of increasing the trigger sensitivity, self-triggering of the device may occur. This means that the device, upon overcoming the self-friction of the movable control parts, starts by itself, without action of a control force. An accurate setting of a small trigger sensitivity is not feasible. Although it is possible to set the trigger sensitivity at a small value, this setting has to be reset or adjusted as soon as the respiration pressure is adjusted. If this is not done, the apparatus may self-trigger and the apparatus may seem to have been triggered by the patient although the patient does not breathe.

It is an object of the invention to create a trigger device which can be adjusted to substantially any desired small starting pressure, such setting being independent of the respiration pressure. The invention relates to a trigger device with adjustable control pressure and with a pressure-sensitive control means which is admitted by the pressure in the lines carrying the respiration gas. The invention comprises an arrangement in which the control means is connected with an actual value indicator and the indicator moves through a deflection range in accordance with the pressure conditions of the gas supply to the patient which is located to affect an inductive barrier. The inductive barrier is adjustable and it is arranged in the circuit of an electronic control device for the operating control valve. The device according to the invention has the advantage that the control means is capable of triggering a reversing device even with very small subpressure impulses without such subpressure impulses being consumed by mechanical friction. Another advantage is that with an adjustment of the desired trigger sensitivity no other value in the respiratory system is changed. In the preferred arrangement the actual value indicator and the inductive barrier are mounted so that they may oscillate coaxially about a common axis, and the inductive barrier is advantageously connected with a manual setting wheel. In addition, the ideal value indicator is mounted so that it is adjustably positioned above a graduation or scale.

Accordingly it is an object of the invention to provide an improved triggering mechanism for a control device for operating a valve in a respiratory system which includes a member which is sensitive to the pressure of the gas being delivered to a patient and which moves an actual value indicator through a deflection range which affects an inductive barrier control which is associated with the control mechanism for the valve controlling the supply of the respiratory fluid.

A further object of the invention is to provide a triggering device for a respiratory system which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

GENERAL DESCRIPTION OF THE PREFERRED EMBODIMENT

Figure 1:
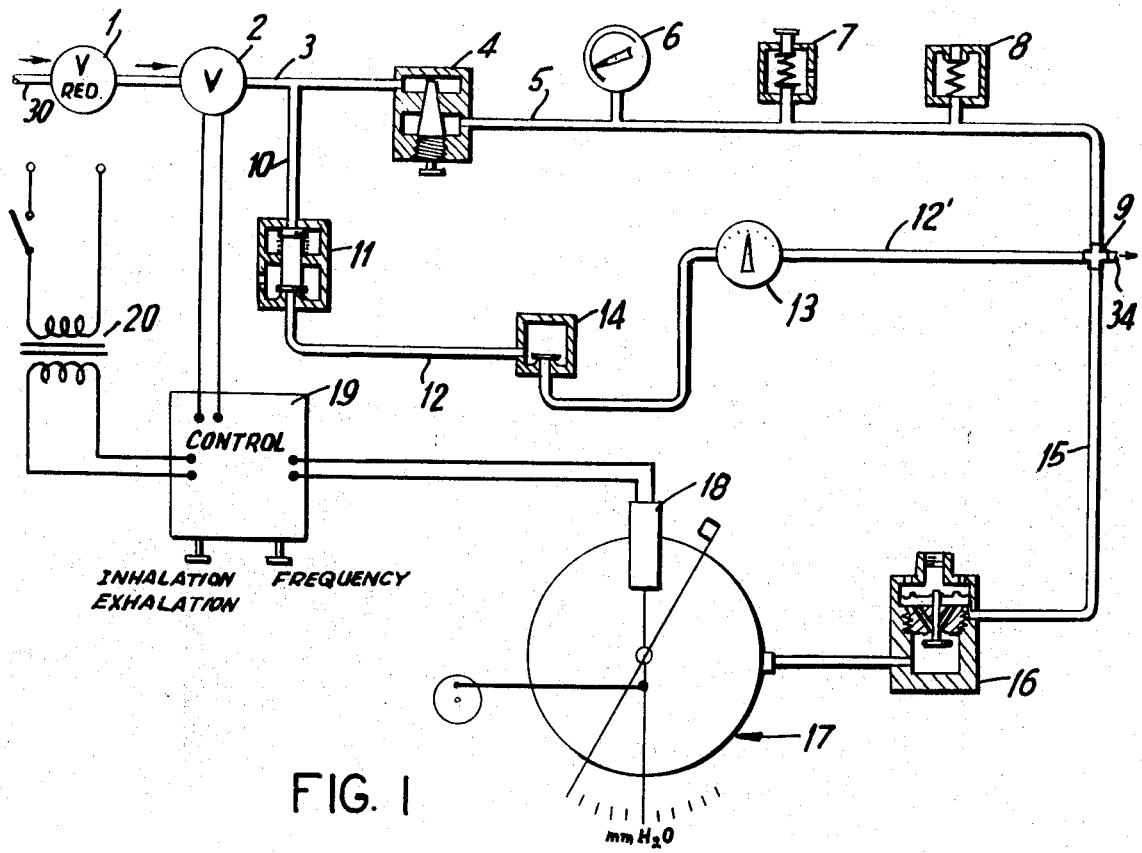
FIG. 1 is a schematic diagram of a respiration system having a triggering device constructed in accordance with the invention.
Figure 2:
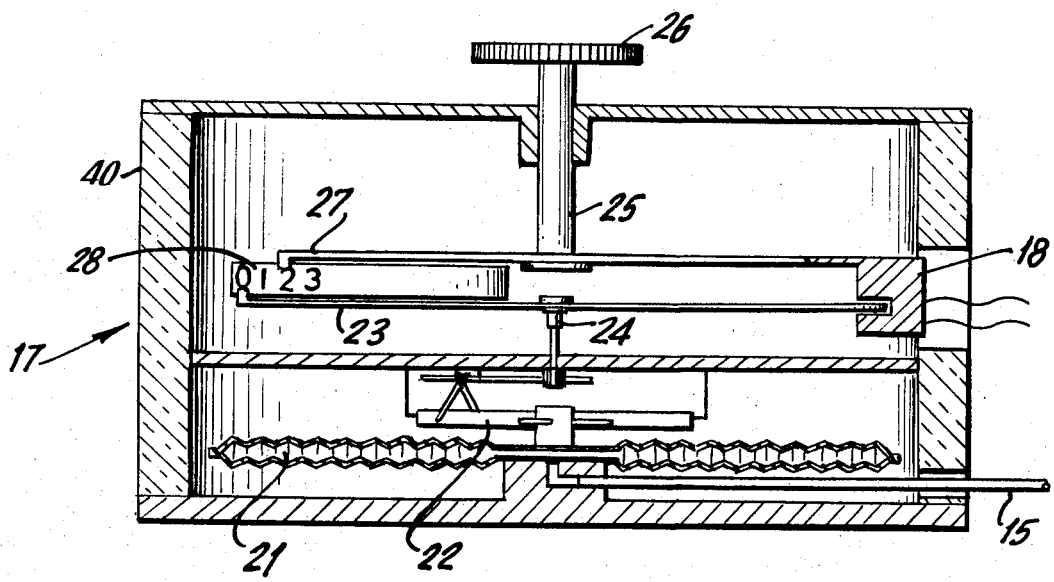
FIG. 2 is a somewhat schematic transverse sectional view of a triggering device constructed in accordance with the invention.

Referring to the drawings in particular, the invention therein includes a line 30 which is connected to a pressure gas system, and which leads to a pressure reducer 1 which is connected through a valve 2 of a pipe which is actuated electromagnetically, such as a solenoid valve. The valve 2 is controlled by a trigger mechanism constructed in accordance with the invention which actuates a control 19 therefor.

The gas is directed through the valve 2 through a line 3 to a flow valve 4 by which the gas velocity is adjusted. Gas, exiting from the flow valve 4 moves through a pressure line or conduit 5 in which is located a pressure gage 6, a pressure safety valve 7 and an additional air inlet valve 8. The pressure line 5 connects into a connection piece 9 which has a branch 34 which leads to the patient as indicated by the arrow.

The line 3 includes a branch 10 which leads to the exhalation check valve 11 which blocks the line 12 in the inhaling phase. Lines 12 and 12' extend from the check valve 11 to the connection 9 and they carry a back-pressure valve 14 and a volumeter 13.

A line 15 extends from the connection piece 9 to a trigger device 17 constructed in accordance with the invention and it includes an over-pressure safety valve 16. The trigger device includes an adjustable inductance barrier 18 which is arranged within the electric circuit of an electronic control unit 19 which is fed by a transformer 20. In the control unit 19 the relation of inhalation to exhalation is set in a known manner and in addition the frequency can also be adjusted at this location.

In accordance with the invention, the trigger 17 includes a housing 40 in which is located an expandable control element, such as a control means 21 which is connected to the line 15 and which is designed as a capsule spring in the embodiment shown. Through a transmission station or system 22 (which is not shown in detail but which is of a known design) the control means 21 is connected to an actual value indicator 23 and it causes a movement of the indicator in proportion to the expansion and contraction of the control 21 caused by pressure variations.

A hand wheel 26 is provided for setting an indicator 27 which may be adjustably positioned in respect to a scale or graduation 28.

The negative inhalation impulses coming from the patient produce or cause a deflection of the capsule spring 21 to move the transmission unit 22 and the actual value indicator 23. The indicator 23 moves through the inductive barrier 18 and interrupts the recoupling thereof to the electronic control unit 19 in dependence on the setting of this inductive barrier. The thus produced electrical impulses in the control unit 19 is amplified and controls the valve 2.

By turning the hand wheel 26 the ideal value indicator 27 can be set at any desired value whereby the inductive barrier 18 is adjusted accordingly. The inductive barrier 18 may also be adjusted to any desired trigger sensitivity.

What is claimed is:

1. A trigger device with adjustable ideal value of control pressure and with a pressure sensitive control means admitted by the pressure in the lines carrying the respiration gas, characterized in that the control means (21) is connected with an actual value indicator (23) and that within the deflection range of the latter an adjustable inductive barrier (18) is provided which is arranged in the circuit of an electric control device (19).

2. A trigger device for the operation of a control for a valve for regulating the supply of a respiratory gas to a patient, comprising a respiratory gas supply line having a control valve for regulating the supply of gas to the patient, an expandable control member adapted to be connected to the line carrying the respiratory gas to the patient, an electronic control device including a variable pulse control circuit connected to said valve for operating said valve in accordance with the variation of the pulse, an actual value indicator movably mounted adjacent said control member and being deflectable by variation of said control member, and an inductive barrier arranged in the circuit of said control device for interrupting the recoupling of said device, and located in the deflection range of said indicator for varying said inductive barrier in proportion to its deflection.

3. A device according to claim 2, wherein said actual value indicator and said inductive barrier are mounted for oscillation about a common axis.

4. A device according to claim 2, including a manual setting wheel connected to said conductive barrier and having an ideal value indicator defined thereon, and an indicator scale adjacent said ideal value indicator of said inductive barrier and said actual value indicator.

5. A trigger device according to claim 2, wherein said device includes a housing, means mounting said inductive barrier in said housing for rotatable movement about an axis, said inductive barrier having an indicator arm portion for indicating an ideal value, a scale defined around said housing adjacent said ideal indicator and said actual value indicator, said actual value indicator being rotatably mounted in said housing for rotation about an axis concentric with the axis of rotation of said inductive barrier.

* * * * *